W. A. FREISE & T. H. CAMPBELL.
WATER PURIFIER.
APPLICATION FILED OCT. 9, 1911.

1,036,214.

Patented Aug. 20, 1912.
3 SHEETS—SHEET 3.

WITNESSES:
Harry E. Pfeiffer
Fred'k H. W. Fraentzel

INVENTORS:
William A. Freise &
Thomas H. Campbell..
BY Fraentzel and Richards,
ATTORNEYS

UNITED STATES PATENT OFFICE.

WILLIAM A. FREISE, OF NEW YORK, AND THOMAS H. CAMPBELL, OF BROOKLYN, NEW YORK; SAID CAMPBELL ASSIGNOR TO SAID FREISE.

WATER-PURIFIER.

1,036,214.     Specification of Letters Patent.      Patented Aug. 20, 1912.

Application filed October 9, 1911. Serial No. 653,486.

*To all whom it may concern:*

Be it known that we, WILLIAM A. FREISE and THOMAS H. CAMPBELL, citizens of the United States, residing at New York, in the county of New York and State of New York, and Brooklyn, county of Kings, and State of New York, respectively, have invented certain new and useful Improvements in Water-Purifiers; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in water-filters; and, the invention relates, more particularly, to a novel flushing-out mechanism for the apparatus which acts and operates automatically and simultaneously with the valve-mechanism of the filter, as the said valve-mechanism is operated.

The invention has for its principal object to provide an automatically coöperating and self-cleaning water-purifier or filter, with a view of providing a simply constructed and efficiently operating mechanism, by means of which the filth, mud, and other impurities which are permitted to settle in the bottom of the filter-casing are automatically flushed out and removed, every time that the valve-mechanism, which admits of the supply of water into the filtering apparatus, is operated.

The invention has for its further object to provide, in connection with a water-filter or purifier, a flush-out mechanism or cleaning-out device which is automatically operated in connection with the water inlet-valve, at the time the said valve is opened, the flush-out mechanism, however, immediately becoming inactive, while the water from the inlet-valve is permitted to flow into and through the filtering apparatus; but, the said flush-out mechanism again becoming active, when the water-inlet valve is being closed, the said flush-out mechanism immediately again becoming inactive, as soon as the water-inlet valve has been closed down upon its seat.

One of the main purposes of the present invention, therefore, is to provide in connection with a water-purifier or filter a flush-out mechanism which will become both active and inactive during the opening and closing operations of the water-inlet valve and its mechanism, so that every time water is drawn from the filter, the flush-out mechanism is operated twice; first, when the water-inlet valve leaves its seat, and secondly, when the said valve is again closed down upon its seat.

Other objects of this invention not at this time more particularly enumerated will be clearly understood from the following detailed description of the present invention.

With the various objects of the present invention in view, the said invention consists, primarily, in the novel water purifier or filter hereinafter set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figs. 4, 5 and 6 are transverse vertical sections of the said lower flush-out portion of the water-purifier and the flush-out mechanism, said mechanism being represented in elevation, and said mechanism being shown in its three consecutive positions, in said Figs. 4, 5 and 6; Fig. 4 illustrating the parts in their normal initial and inactive positions, Fig. 5 illustrating the parts in their actuated and active or flushing-out relation, and Fig. 6 illustrating the same parts in their relative positions, immediately after having been actuated.

Similar characters of reference are employed in all of the above described views, to indicate corresponding parts.

Referring now to the said drawings, the reference-character 1 indicates the complete water-purifier or filter embodying the principles of the present invention, the same comprising a main shell or casing, as 2, which is open at the bottom and is provided with a closed top or head, as 3, said top or head being formed with a centrally disposed and internally screw-threaded opening 4. Upon its lower and open portion the said main shell or casing 2 is formed with an annular flange 5, said flange being provided with the usual bolt-receiving perforations or openings for the reception of the bolts or screws 6.

Figure 4:
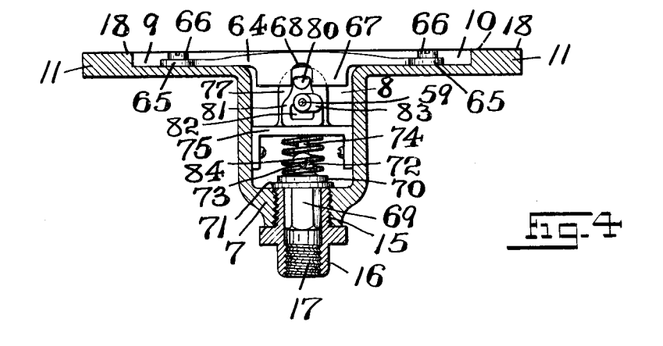
Figure 5:
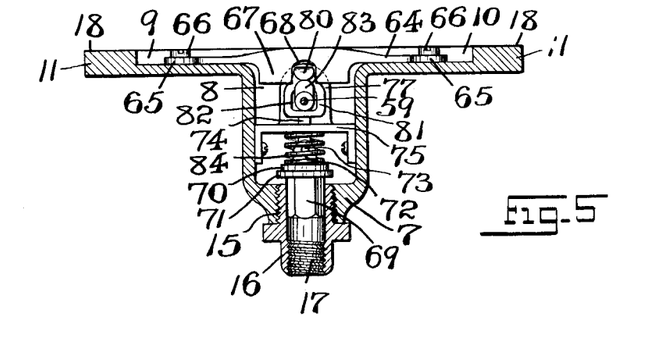
Figure 6:
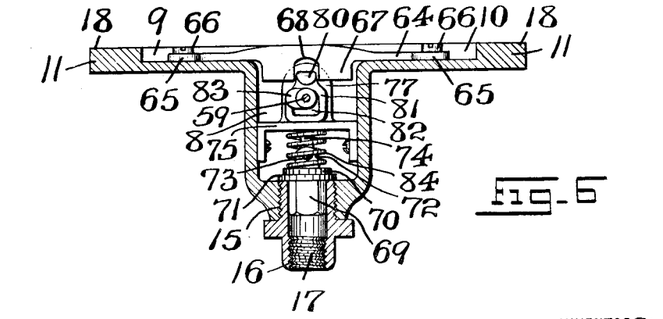

The reference-character 7 indicates the previously mentioned lower flush-out portion or element which may be of any suitable configuration, but is preferably made with a narrow part 8 of the shape shown more particularly in the several figures of the drawings, said narrow part extending diagonally across the said element or member 7 which is provided also with the two shallow depressions 9 and 10, shown more particularly in Figs. 4, 5 and 6 of the drawings. The said element or member 7 is also provided with an annular flange, as 11, formed with the holes or perforations 12, into and through which the previously mentioned bolts or screws 6 extend for the reception upon said bolts or screws of the nuts 13, and whereby the said flush-out member or element 7 is secured in its operative position upon the lower open end of the main shell or casing 2, in the manner clearly shown in Fig. 1 of the drawings. As a protection to the said member or element 7, as well as for the purpose of providing an ornamental support or base, the said member or element 7 is surrounded by a member or element 14, which is preferably a casting, and upon the upper marginal edge-portion of which the said assembled member or element 7 and the main shell or casing 2 are mounted in substantially the manner illustrated. The narrow part 8 is provided in its deepest portion with an internally screw-threaded hub-like member or boss 15 into which is screwed a suitably formed stopper or valve-plug seat, as 16, and which is also formed with an internally screw-threaded portion 17 for the attachment thereto of a suitable outlet-pipe, as will be clearly evident.

As shown, the upper marginal portion 18 of the previously mentioned member or element 7 extends beyond the inner wall or surface of the main shell or casing 2, so as to provide an off-set upon which rests a suitably formed disk or plate 19 which is made with suitably disposed holes or perforations 20, said disk or plate 19 providing a perforated bottom for said main shell or casing 2. Resting upon this perforated disk or plate 19 is a diaphragm 21 of asbestos or other similar material. A suitable filtering layer 22, usually loose bone-coal, is arranged upon said diaphragm 21, and disposed upon this layer 22 is another diaphragm 23, also of asbestos, or any other similar material. Placed upon said diaphragm 23 is a solid carbon block 24, upon the upper surface of which is placed another diaphragm 25 of asbestos, or any other similar material. The remaining inner portion of the said main shell or casing 2 is filled with a layer of loose bone-coal, as 26, and suitably disposed within this layer 26, is a suitably formed solid carbon block 27. This block 27 is made with a socket 28 and an enlarged socket-like portion 29 in which is arranged a suitably formed stopper 30 of cork or any other suitable material. Screwed into the screw-threaded opening 4 of the end or head 3 is the screw-threaded shank 32 of an ornamental nut or similar device, as 31, which is formed with a screw-threaded hole 33. Suitably screwed into a portion of said screw-threaded hole 33 is the screw-threaded end-portion 35 of a short pipe or tube 34, said pipe or tube being preferably made with screw-threads, as 36, which are screwed into the said cork or stopper 30, and has its lower end-portion extending from the bottom of said cork or stopper into the said socket 28, substantially in the manner illustrated in said Fig. 1 of the drawings. It will be understood, however, that these parts may be otherwise arranged and may be differently connected, if desired. Screwed into the upper portion of said screw-threaded hole 33 is the screw-threaded end-portion 38 of a delivery pipe 37, the said pipe extending slightly in an upward direction and then being bent, so as to form a goose-neck 39, and terminating at the side of the said main shell or casing 2 in a downwardly extending portion, as 40, which is provided at its free end with a suitably formed delivery member or nozzle, as 41. Screwed into the one side of the said lower flush-out portion 7, and so as to communicate with the interior of the said portion 7, is the screw-threaded end-portion 43 of a water-inlet valve 42, said valve comprising a suitable valve-casing 44 formed with an inlet 45 and an internally disposed wall 46, all arranged to provide the duct-like portions 47 and 48. Suitably screwed upon the screw-threaded portion 49 of the casing 44 is a bearing-cap 50, in which is rotatably arranged a stem 51 which is provided with a hand-piece, as 52. The said stem 51 is formed with a screw-threaded boss or enlargement 53 which is screwed into the internally screw-threaded part 54 of the said casing 44, so as to be adapted to be moved back and forth upon said screw-threaded part, as will be clearly evident. Connected with and extending from the said boss or enlargement 53 is a shouldered portion 55 upon which is disposed a flexible gasket or washer, as 56, which is adapted to be closed down upon a valve-seat, as 57. Suitably connected with the shouldered valve or plug-portion 55, preferably by being screwed into a screw-threaded socket 58, is a stem or rod 59, said stem or rod extending into and through a guide-portion 60 in the wall or partition 46, through the outlet-portion 61 of the valve-casing, and then into the narrow interior portion 8 of the said flush-out member or element 7.

When the valve has been opened, the direction of the flow of the water is into the portion 47, through the opened valve-seat 57, into the chambered or duct-like portion 48, and thence into the interior of the lower flush-out member or element 7, from which the water passes up into the various cleansing and filtering layers within the main shell or casing 2, being drawn from said shell or casing at the nozzle 41 of the delivery-pipe 37. Movably disposed upon the said stem or rod 59 is a flexible plug or block, as 62, which prevents any passage of the water through the guide-portion 60, and is caused to constantly close said guide-portion by means of a coiled spring 63, substantially as shown in said Fig. 1 of the drawings. Suitably secured within the shallow depressed portions 9 and 10 of the said flush-out member of element 7, and extending across the narrow part 8 thereof, and approximately at right angles to the said rod or stem 59, is a bridge-piece or bar 64, the respective ends of which are made with eye-portions, as 65, for the reception of screws 66 by means of which the said piece or bar 64 is secured in place. The central portion of the said piece or bar 64 is preferably made with a thicker part, as 67, and with an open part 68 which forms a guide, the purpose of which will presently be more fully specified. The said bridge-piece or bar 64 also acts as a stay or support for the combined weight of the several filtering layers and solid carbon blocks, as will be clearly understood.

Figure 1:
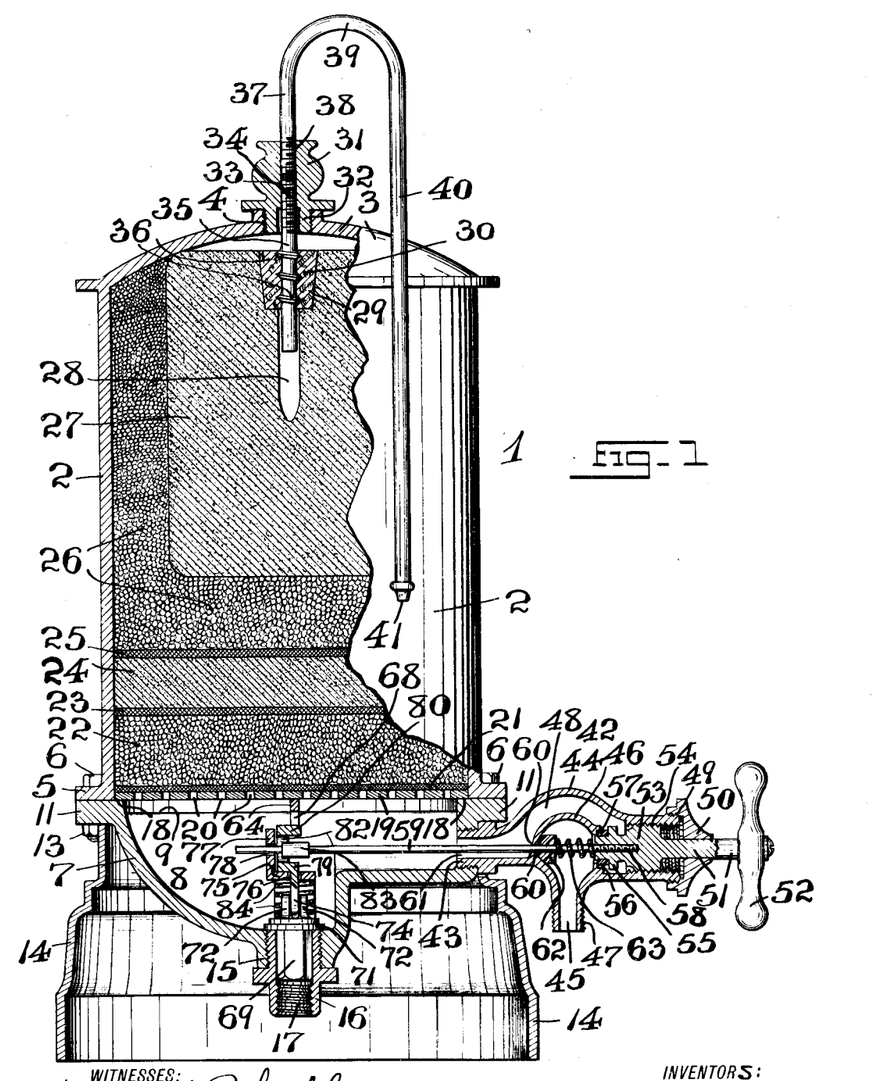
Figure 1 is a view partly in transverse vertical section and partly in elevation of a filtering apparatus, and its automatically operating self-cleaning mechanism, all made according to the principles of the present invention and showing one embodiment thereof.
Figure 2:
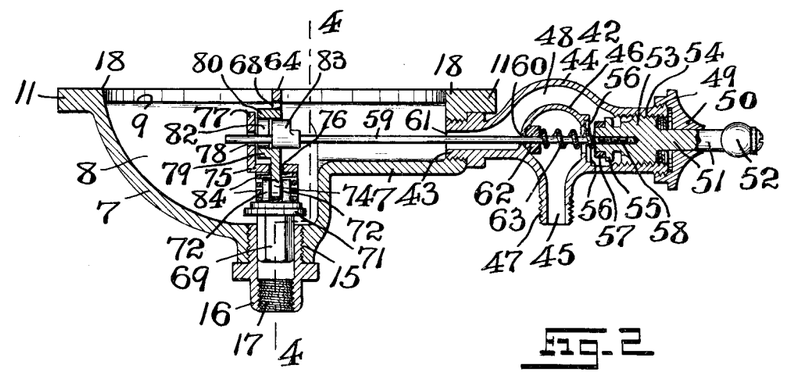
Fig. 2 is a transverse vertical section of the lower flush-out portion of the casing of the water-purifier, the water-inlet valve and its mechanism, and the flush-out mechanism, the inlet valve being represented in removed relation from the valve-seat, and the flush-out mechanism being shown in its active or operated relation to the flush-out or water-outlet with which the flush-out portion of the said casing of the water-purifier is provided.
Figure 3:
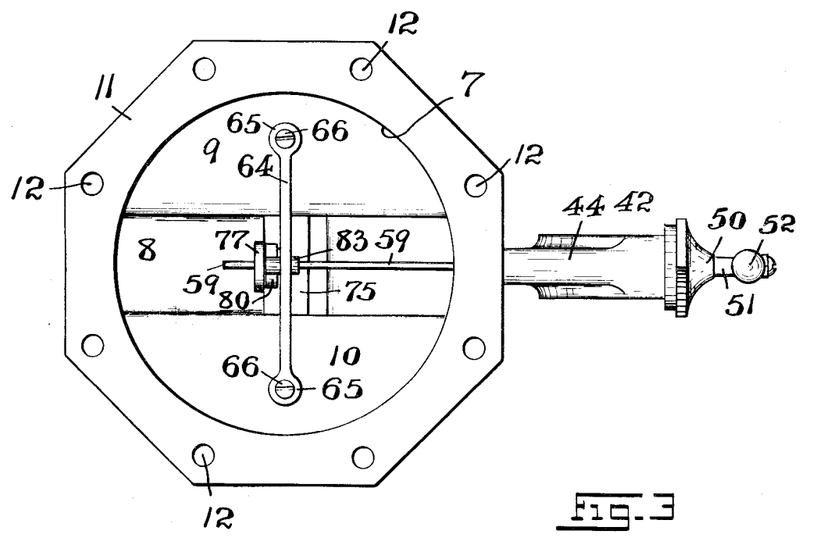
Fig. 3 is a top or plan view of the parts represented in said Fig. 2.

Slidably arranged within the previously mentioned tubular stopper or valve-plug 16 is a polygonally formed member or block, as 69, which, when in its normal initial position extends slightly above the said tubular stopper or valve-plug 16 and is provided with an annular flange 70, a flexible or resilient gasket or washer 71 being placed about the said member or block 69, directly beneath said flange 70, and being adapted to rest upon the upper marginal edge-portion of said tubular stopper or valve-plug 16, forming a seat for said washer or gasket, so as to normally close the water-outlet in the bottom of the lower flush-out member or element 7, as clearly shown in Figs. 1, 4 and 6 of the drawings. The upper end-portion of the said polygonal block 69 is provided with a means of pivotal connection, preferably in the form of a pair of perforated ears 72, carrying a pintle 73 upon which is pivotally mounted the lower end-portion of a short stem 74. Suitably secured within the narrow part 8 of the flush-out member or element 7 is a yoke-shaped or other suitably formed bearing-plate 75 which is formed with a hole or perforation 76, forming a bearing for the stem 74, and in which the said stem is adapted to reciprocate. Connected with the upper portion of said bearing-plate 75 is an upwardly projecting member or ear 77 formed with a hole or perforation 78 in which the free end-portion of the previously mentioned stem or rod 59 is slidably mounted and forms a bearing for the said rod or stem 59. Connected with the upper portion of the said short stem 74 is another yoke-shaped member, as 79, said member being provided at the top with a suitably formed lug or projection 80, the lower surface 81 of which is cam-shaped or curved, substantially as shown in the several figures of the drawings. The said stem or rod 59 extends also through the open part 82 of said yoke-shaped member 79, and suitably mounted upon the said stem or rod 59 is a cam-shaped member or element 83, which during the rotary movements of the said stem or rod 59 is brought into slidable lifting engagement with the cam-shaped or curved surface 81 of the lug or projection 80, so that at each quarter-turn of the rod or stem 59, the lug or projection 80 and the parts connected therewith are raised, so that the flush-out in the bottom of the element or member 7 is opened and is again closed, as soon as the cam-shaped member or element 83 passes beyond the said lug or projection, by the weight of the polygonal member or block 69 and a coiled spring 84 which is arranged about the short stem 74, substantially in the manner shown in the drawings.

The various devices and parts are constructed and arranged in such a manner, so that when the water-inlet valve is opened, the flush-out mechanism immediately becomes active for a short interval to open the flush-out in the bottom of the member or element 7; and, while the said water-inlet valve is still kept open, the said flush-out mechanism again becomes inactive, so as to again close the said flush-out in said member or element 7. When the water-inlet valve is again closed, the said flush-out mechanism is also once more set in action, so that the flush-out in the bottom of said member or element 7 is a second time opened for a short interval, and then immediately closed again. It will thus be seen, that whenever the water-inlet valve is opened and closed, the water contained in the flush-out member or element 7 will flush out the lower portion of the filtering or purifying apparatus at two different times, so that any deposited sediment or filth which has collected in said member or element 7 is readily removed. When the filter is at rest, any water contained in the lower part or portions of the filtering medium contained in the main shell or casing 2 will flow back into the said lower flush-out member or element 7, thereby removing any deposited sediment from the filtering medium; and, furthermore, removing it, while in suspension in the water, from the said member or element 7 through the flush-out opening, as will be clearly evident. A sufficient quantity of cleared and filtered water will at all times be retained in the upper part of the filtering medium, so that immediately upon again opening the water-inlet valve, the clarified and purified water will flow from the nozzle 41.

We are aware that changes may be made in the general arrangements and combinations of the various devices and parts, as well as in the details of the construction of the said parts, without departing from the scope of the present invention as set forth in the foregoing specification, and as defined in the clauses of the claim which are appended thereto. Hence, we do not limit our invention to the exact arrangements and combination of the various devices and parts as described in the said specification, nor do we confine ourselves to the exact details of the construction of the said parts as illustrated in the accompanying drawings.

We claim:—

1. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a discharge-opening, a closing means normally closing the said opening, a water-inlet valve connected with said flush-out element, a rotary valve-plug within said inlet-valve, a rod connected with said valve-plug, so as to rotate therewith, said rod extending from the discharge-outlet of said inlet-valve and into said flush-out element, and means between the said closing means and the said rod adapted to be actuated by the rotary movement of said rod when the inlet-valve is operated to remove the closing means from the discharge-opening simultaneously with the passage of the water through said inlet-valve into the said flush-out element and the filtering or purifying medium in said main shell or casing.

2. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a discharge-opening, a closing means normally closing the said opening, a water-inlet valve connected with said flush-out element, a rotary valve-plug within said inlet-valve, a rod connected with said valve-plug, so as to rotate therewith, said rod extending from the discharge-outlet of said inlet-valve and into said flush-out element, and means between the said closing means and the said rod adapted to be intermittently actuated by the rotary movement of said rod so as to remove said closing means from the discharge-opening in said flush-out element simultaneously with the opening of said inlet valve and also simultaneously with the closing of said inlet valve.

3. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a discharge-opening, a closing means normally closing the said opening, a water-inlet valve connected with said flush-out element, a rotary valve-plug within said inlet-valve, a rod connected with said valve-plug, so as to rotate therewith, said rod extending from the discharge-outlet of said inlet-valve and into said flush-out element, and means between the said closing means and the said rod adapted to be intermittently actuated by the rotary movement of said rod, during the operation of the said inlet valve.

4. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a flush-out opening, a block slidably arranged in said opening, a closing means connected with said block for normally closing the said opening, a yoke-shaped member connected with said block, and a cam-shaped lug upon said yoke-shaped member, a water-inlet valve connected with said flush-out element, a rotary valve-plug within said inlet-valve, a rod connected with said valve-plug so as to rotate therewith, said rod extending from the discharge-outlet of said inlet-valve and into said flush-out element, and a cam upon said rod adapted to be brought into engagement with the cam-shaped lug of said yoke-shaped member during the rotary movement of said rod when the inlet-valve is operated for lifting said block, so as to open the discharge-opening in said flush-out member simultaneously with the passage of the water through said inlet-valve into the said flush-out element and the filtering or purifying medium in said main shell or casing.

5. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a flush-out opening, a block slidably arranged in said opening, a closing means connected with said block for normally closing the said opening, a yoke-shaped member connected with said block, and a cam-shaped lug upon said yoke-shaped member, a water-inlet valve connected with said flush-out element, a rotary valve-plug within said inlet-valve, a rod connected with said valve-plug so as to rotate therewith, said rod extending from the discharge-outlet of said inlet-valve and into said flush-out element, and a cam upon said rod adapted to be brought into engagement with the cam-shaped lug of said yoke-shaped member during the rotary movement of said rod when the inlet-valve is operated for lifting said block intermittently by means of the rotary movement of said rod, so as to alternately open and close the discharge-opening of said flush-out element simultaneously with the opening of said inlet-valve and simultaneously with the closing of said inlet-valve.

6. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a flush-out opening, a block slidably arranged in said opening, a closing means connected with said block for normally closing the said opening, a yoke-shaped member connected with said block, and a cam-shaped lug upon said yoke-shaped member, a water-inlet valve connected with said flush-out element, a rotary valve-plug within said inlet-valve, a rod connected with said valve-plug so as to rotate therewith, said rod extending from the discharge-outlet of said inlet-valve and into said flush-out element, and a cam upon said rod adapted to be brought into engagement with the cam-shaped lug of said yoke-shaped member during the rotary movement of said rod when the inlet-valve is operated for lifting said block intermittently by means of the rotary movement of said rod during the operation of said inlet-valve.

7. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a flush-out opening, a perforated bearing-plate arranged within said flush-out member, an upwardly extending and perforated ear upon said bearing-plate, a block slidably arranged in said flush-out opening, a closing means connected with said block for normally closing the said opening, a stem pivoted to said block, said stem extending upwardly and being movably arranged in the perforation of said bearing-plate, a yoke-shaped member connected with said stem, a spring encircling said stem, and a cam-shaped lug upon said yoke-shaped member, a water-inlet valve connected with said flush-out element, a rotary valve-plug within said inlet-valve, a rod connected with said valve-plug so as to rotate therewith, said rod extending from the discharge-outlet of said inlet-valve and into said flush-out element, said rod having its free end-portion movably arranged in the perforated ear of said bearing-plate, and a cam upon said rod adapted to be brought into engagement with the cam-shaped lug of said yoke-shaped member during the rotary movement of said rod when the inlet-valve is operated for lifting said block so as to open the discharge-opening in said flush-out member simultaneously with the passage of the water through said inlet-valve into the said flush-out element and the filtering or purifying medium in said main shell or casing.

8. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a flush-out opening, a perforated bearing-plate arranged within said flush-out member, an upwardly extending and perforated ear upon said bearing-plate, a block slidably arranged in said flush-out opening, a closing means connected with said block for normally closing the said opening, a stem pivoted to said block, said stem extending upwardly and being movably arranged in the perforation of said bearing-plate, a yoke-shaped member connected with said stem, a spring encircling said stem, and a cam-shaped lug upon said yoke-shaped member, a water-inlet valve connected with said flush-out element, a rotary valve-plug within said inlet-valve, a rod connected with said valve-plug so as to rotate therewith, said rod extending from the discharge outlet of said inlet-valve and into said flush-out element, said rod having its free end-portion movably arranged in the perforated ear of said bearing-plate, and a cam upon said rod adapted to be brought into engagement with the cam-shaped lug of said yoke-shaped member during the rotary movement of said rod when the inlet-valve is operated for lifting said block intermittently by means of the rotary movement of said rod so as to alternately open and close the discharge-opening of said flush-out element simultaneously with the closing of said inlet-valve.

9. A water-purifying apparatus comprising a main shell or casing containing a filtering or purifying medium, a flush-out element connected with said shell or casing and in communication therewith so as to receive the filth and sediment from the filtering or purifying medium contained in said shell or casing, said flush-out element being provided with a flush-out opening, a perforated bearing-plate arranged within said flush-out member, an upwardly extending and perforated ear upon said bearing-plate, a block slidably arranged in said flush-out opening, a closing means connected with said block for normally closing the said opening, a stem pivoted to said block, said stem extending upwardly and being movably arranged in the perforation of said bearing-plate, a yoke-shaped member connected with said stem, a spring encircling said stem, and a cam-shaped lug upon said yoke-shaped member, water-inlet valve connected with said flush-out element, a rotary valve-plug within said inlet-valve, a rod connected with said valve-plug so as to rotate therewith, said rod extending from the discharge-outlet of said inlet-valve and into said flush-out element, said rod having its free end-portion movably arranged in the perforated ear of said bearing-plate, and a cam upon said rod adapted to be brought into engagement with the cam-shaped lug of said yoke-shaped member during the rotary movement of said rod when the inlet-valve is operated for lifting said block intermittently by means of the rotary movement of said rod during the operation of said inlet-valve.

10. A water-purifying apparatus comprising a main shell or casing containing a filtering or purifying medium, a chambered flush-out element connected with said shell or casing and in communication therewith so as to receive the filth and sediment from the filtering or purifying medium contained in said shell or casing, said flush-out element being provided with a discharge-opening, a closing means normally closing said opening, a water-inlet valve connected with said flush-out element, said inlet-valve comprising a valve-casing, a wall within said casing so as to provide a pair of duct-like portions with the one of which the inlet to said valve is connected and with the other of which the outlet of said valve is connected, said valve-casing being formed with an internally screw-threaded portion and with a valve-seat arranged between the said two duct-like portions, a bearing cap connected with said valve-casing, a stem rotatably arranged in said bearing-cap, said stem being provided with means for operating the same, a screw-threaded boss connected with said stem, said boss being screwed into the internally screw-threaded portion of the valve-casing, a flexible closing means adapted to be closed down upon said valve-seat, a rod connected with said screw-threaded enlargement so as to rotate therewith, said rod extending from the discharge-outlet of said inlet-valve and into said flush-out element, and means between the said closing means and the said rod adapted to be actuated by the rotary movement of said rod when the inlet-valve is operated to remove the closing means from the discharge-opening simultaneously with the passage of the water through said inlet-valve into the said flush-out element and the filtering or purifying medium in said main shell or casing.

11. A water-purifying apparatus comprising a main shell or casing containing a filtering or purifying medium, a chambered flush-out element connected with said shell or casing and in communication therewith so as to receive the filth and sediment from the filtering or purifying medium contained in said shell or casing, said flush-out element being provided with a discharge opening, a closing means normally closing said opening, a water-inlet valve connected with said flush-out element, said inlet-valve comprising a valve-casing, a wall within said casing so as to provide a pair of duct-like portions with the one of which the inlet to said valve is connected and with the other of which the outlet of said valve is connected, said valve-casing being formed with an internally screw-threaded portion and with a valve-seat arranged between the said two duct-like portions, a bearing-cap connected with said valve-casing, a stem rotatably arranged in said bearing-cap, said stem being provided with means for operating the same, a screw-threaded boss connected with said stem, said boss being screwed into the internally screw-threaded portion of the valve-casing, a flexible closing means adapted to be closed down upon said valve-seat, a rod connected with said screw-threaded enlargement so as to rotate therewith, said rod extending from the discharge-outlet of said inlet valve and into said flush-out element, and means between the said closing means and the said rod adapted to be intermittently actuated by the rotary movement of said rod so as to remove said closing means from the discharge-opening in said flush-out element simultaneously with the opening of said inlet valve and also simultaneously with the closing of said inlet valve.

12. A water-purifying apparatus comprising a main shell or casing containing a filtering or purifying medium, a chambered flush-out element connected with said shell or casing and in communication therewith so as to receive the filth and sediment from the filtering or purifying medium contained in said shell or casing, said flush-out element being provided with a discharge opening, a closing means normally closing said opening, a water-inlet valve connected with said flush-out element, said inlet-valve comprising a valve-casing, a wall within said casing so as to provide a pair of duct-like portions with the one of which the inlet to said valve is connected and with the other of which the outlet of said valve is connected, said valve-casing being formed with an internally screw-threaded portion and with a valve-seat arranged between the said two duct-like portions, a bearing-cap connected with said valve-casing, a stem rotatably arranged in said bearing-cap, said stem being provided with means for operating the same, a screw-threaded boss connected with said stem, said boss being screwed into the internally screw-threaded portion of the valve-casing, a flexible closing means adapted to be closed down upon said valve-seat, a rod connected with said screw-threaded enlargement so as to rotate therewith, said rod extending from the discharge-outlet of said inlet-valve and into said flush-out element, and means between the said closing means and the said rod adapted to be actuated by the rotary movement of said rod when the inlet-valve is operated to remove the closing means from the discharge-opening simultaneously with the passage of the water through said inlet-valve into the said flush-out element and the filtering or purifying medium in said main shell or casing.

13. A water-purifying apparatus comprising a main shell or casing containing a filtering or purifying medium, a chambered flush-out element connected with said shell or casing and in communication therewith so as to receive the filth and sediment from the filtering or purifying medium contained in said shell or casing, said flush-out element being provided with a discharge opening, a closing means normally closing said opening, a water-inlet valve connected with said flush-out element, said inlet-valve comprising a valve-casing, a wall within said casing so as to provide a pair of duct-like portions with the one of which the inlet to said valve is connected and with the other of which the outlet of said valve is connected, said valve-casing being formed with an internally screw-threaded portion and with a valve-seat arranged between the said two duct-like portions, a bearing-cap connected with said valve-casing, a stem rotatably arranged in said bearing-cap, said stem being provided with means for operating the same, a screw-threaded boss connected with said stem, said boss being screwed into the internally screw-threaded portion of the valve-casing, a flexible closing means adapted to be closed down upon said valve-seat, a rod connected with said screw-threaded enlargement so as to rotate therewith, said rod extending from the discharge-outlet of said inlet-valve and into said flush-out element, said closing means in said flush-out element comprising a block slidably arranged in said flush-out opening, a stem extending upwardly from said block, a bearing-plate within said flush-out member provided with a perforation in which said stem is movably arranged, a yoke-shaped member connected with said stem, a spring encircling said stem, a cam-shaped lug upon said yoke-shaped member, and a cam upon the rod which is connected with said inlet-valve, said cam being adapted to be brought into engagement with the cam-shaped lug of said yoke-shaped member during the rotary movement of said rod when the inlet-valve is operated for lifting said block so as to open the discharge-opening in said flush-out member simultaneously with the passage of the water through said inlet-valve into the said flush-out element and the filtering or purifying medium in said main shell or casing.

14. A water-purifying apparatus comprising a main shell or casing containing a filtering or purifying medium, a chambered flush-out element connected with said shell or casing and in communication therewith so as to receive the filth and sediment from the filtering or purifying medium contained in said shell or casing, said flush-out element being provided with a discharge opening, a closing means normally closing said opening, a water-inlet valve connected with said flush-out element, said inlet-valve comprising a valve-casing, a wall within said casing so as to provide a pair of duct-like portions with the one of which the inlet to said valve is connected and with the other of which the outlet of said valve is connected, said valve-casing being formed with an internally screw-threaded portion and with a valve-seat arranged between the said two duct-like portions, a bearing-cap connected with said valve-casing, a stem rotatably arranged in said bearing-cap, said stem being provided with means for operating the same, a screw-threaded boss connected with said stem, said boss being screwed into the internally screw-threaded portion of the valve-casing, a flexible closing means adapted to be closed down upon said valve-seat, a rod connected with said screw-threaded enlargement so as to rotate therewith, said rod extending from the discharge-outlet of said inlet-valve and into said flush-out element, said closing means in said flush-out element comprising a block slidably arranged in said flush-out opening, a stem extending upwardly from said block, a bearing-plate within said flush-out member provided with a perforation in which said stem is movably arranged, a yoke-shaped member connected with said stem, a spring encircling said stem, a cam-shaped lug upon said yoke-shaped member, and a cam upon the rod which is connected with said inlet-valve, said cam being adapted to be brought into engagement with the cam-shaped lug of said yoke-shaped member during the rotary movement of said rod when the inlet-valve is operated for lifting said block intermittently by means of the rotary movement of said rod so as to alternately open and close the discharge-opening of said flush-out element simultaneously with the opening of said inlet-valve and simultaneously with the closing of said inlet-valve.

15. A water-purifying apparatus comprising a main shell or casing containing a filtering or purifying medium, a chambered flush-out element connected with said shell or casing and in communication therewith so as to receive the filth and sediment from the filtering or purifying medium contained in said shell or casing, said flush-out element being provided with a discharge opening, a closing means normally closing said opening, a water-inlet valve connected with said flush-out element, said inlet-valve comprising a valve-casing, a wall within said casing so as to provide a pair of duct-like portions with the one of which the inlet to said valve is connected and with the other of which the outlet of said valve is connected, said valve-casing being formed with an internally screw-threaded portion and with a valve-seat arranged between the said two duct-like portions, a bearing-cap connected with said valve-casing, a stem rotatably arranged in said bearing-cap, said stem being provided with means for operating the same, a screw-threaded boss connected with said stem, said boss being screwed into the internally screw-threaded portion of the valve-casing, a flexible closing means adapted to be closed down upon said valve-seat, a rod connected with said screw-threaded enlargement so as to rotate therewith, said rod extending from the discharge-outlet of said inlet valve and into said flush-out element, said closing means in said flush-out element comprising a block slidably arranged in said flush-out opening, a stem extending upwardly from said block, a bearing-plate within said flush-out member provided with a perforation in which said stem is movably arranged, a yoke-shaped member connected with said stem, a spring encircling said stem, a cam-shaped lug upon said yoke-shaped member, and a cam upon the rod which is connected with said inlet-valve, said cam being adapted to be brought into engagement with the cam-shaped lug of said yoke-shaped member during the rotary movement of said rod when the inlet-valve is operated for lifting said block intermittently by means of the rotary movement of said rod during the operation of said inlet-valve.

In testimony that we claim the invention set forth above we have hereunto set our hands this 4th day of October, 1911.

WILLIAM A. FREISE.
THOMAS L. CAMPBELL.

Witnesses:
GEORGE D. RICHARDS,
MAYBELLE McADOO.